(12) United States Patent
Kim et al.

(10) Patent No.: US 9,270,103 B2
(45) Date of Patent: Feb. 23, 2016

(54) INSULATION COVERED BUS BAR

(71) Applicants: Hyundai Motor Company, Seoul (KR); YURA CORPORATION CO., LTD., Chungcheongbuk-do (KR)

(72) Inventors: Ju Han Kim, Yongin-si (KR); Gil Woo Jung, Suwon-si (KR); Ki Wook Ohm, Uiwang-si (KR)

(73) Assignees: HYUNDAI MOTOR COMPANY, Seoul (KR); YURA CORPORATION CO., LTD., Cheongwon-Gun, Chungcheongbuk-Do (KR)

( * ) Notice: Subject to any disclaimer, the term of this patent is extended or adjusted under 35 U.S.C. 154(b) by 0 days.

(21) Appl. No.: 14/328,197

(22) Filed: Jul. 10, 2014

(65) Prior Publication Data

US 2015/0188302 A1    Jul. 2, 2015

(30) Foreign Application Priority Data

Dec. 27, 2013    (KR) .................. 10-2013-0164908

(51) Int. Cl.
*H02G 5/04* (2006.01)
*B60R 16/03* (2006.01)

(52) U.S. Cl.
CPC . *H02G 5/04* (2013.01); *B60R 16/03* (2013.01)

(58) Field of Classification Search
CPC ...................................................... H02G 5/04
USPC ...................................... 174/68.2, 74 R, 77 R
See application file for complete search history.

(56) References Cited

U.S. PATENT DOCUMENTS

| | | | | |
|---|---|---|---|---|
| 1,995,407 A | * | 3/1935 | Walker | 174/74 R |
| 3,588,150 A | * | 6/1971 | Robert | 285/381.5 |
| 4,739,801 A | * | 4/1988 | Kimura et al. | 138/120 |
| 4,822,951 A | * | 4/1989 | Wilson et al. | 174/68.2 |
| 5,283,393 A | * | 2/1994 | Guginsky | 174/102 R |
| 5,696,351 A | * | 12/1997 | Benn et al. | 174/92 |

FOREIGN PATENT DOCUMENTS

| | | |
|---|---|---|
| JP | 2004-095530 A | 3/2004 |
| JP | 2006-074856 A | 3/2006 |
| JP | 2012-138333 A | 7/2012 |
| JP | 2013-062103 A | 4/2013 |
| KR | 20-2008-0004150 U | 9/2008 |
| KR | 2011-0042777 A | 4/2011 |

* cited by examiner

*Primary Examiner* — Dhirubhai R Patel
(74) *Attorney, Agent, or Firm* — McDermott Will & Emery LLP

(57) ABSTRACT

An insulation covered bus bar includes a bus bar formed of a conductive material for transmission of electric power. An insulation tube wraps the bus bar and formed of an insulation material having a characteristic of electric insulation. A fixing unit is formed so as to wrap around an outer circumferential surface of the bus bar, connected to an end of the insulation tube, installed to be fixedly disposed to the bus bar so that the insulation tube is fixed within the bus bar.

11 Claims, 3 Drawing Sheets

INSULATION COVERED BUS BAR

CROSS-REFERENCE TO RELATED APPLICATION

The present application claims the benefit of priority to Korean Patent Application Number 10-2013-0164908 filed on Dec. 27, 2013, the entire contents of which application are incorporated herein for all purposes by this reference.

TECHNICAL FIELD

The present disclosure relates to an insulation covered bus bar for protecting a basic insulation of the bus bar and the bus bar from impact.

BACKGROUND

Generally, a bus bar has been used as a medium for supplying and distributing power to supply electrical energy. The bus bar does not have flexibility, and thus, it is difficult to process it. However, larger amounts of electrical energy than a cable can be transferred by the bus bar, and its mechanical strength is very great.

Due to advanced electrical power technology, the amount of electricity consumption has increased, and a high voltage power has been used. Thus, a medium for protecting safe accident caused from the high voltage power has been applied basically to the use of high voltage power.

Particularly, in recent years, electrical insulation for a bus bar is necessarily being applied for transmitting power from a high voltage battery and a fuel cell stack to an external electric power distributor and a power converter or electric loads in electric vehicles and hybrid vehicles.

It has been possible to provide basic insulation to a high voltage charging part such as bus bar to prevent electrocution or short circuits due to direct contact of a human body or a structure wherein the bus bar is coated with solid insulation material using dipping, spray coating, powder coating (powder coating), shrink tubing, injection, etc.

The conventional method for insulating the bus bar as described above has the following problems.

In the case of dipping, a doping target-object (bus bar) is immersed into a liquid resin and is covered with insulating plastic resin film as a relatively simple process. However, it is difficult to control the thickness and shape of a covered film, and quality varies depending on the skill of a worker.

In a case of spray coating, liquid coating material is coated over a surface of a coating target-object (bus bar) using a spray gun, and it is not possible to obtain a rigid level of film thickness, and thus, the film is easily broken due to external impact. Further, the quality varies depending on the skill of the worker, the coating material is wastefully used, and the solvent is harmful to the human body.

In a case of powder coating, powder is coated on the coating-target object (bus bar) using an electrostatic powder coating step, and then the coating material is heated and melted in a high-temperature drying furnace to cover a resin film thereon. Although the film for the power coating method is more rigid than that for the spray coating method, sanding for the coating target-object has to be pre-performed. Further, the coating material needs to be well managed, and a process line and a drying furnace are needed to obtain a superior quality of coating film.

In a case of shrink tubing for a three-dimensional shaped bus bar, stress is applied excessively over the outside areas of the bending part of the bus bar, and thus, it can be broken due to small shocks. Further, a shrinkage rate is non-uniform, and thus, it is difficult to control dimension and takes longer to process the work.

In a case of injection, a plastic resin is covered by insert-injecting a bus bar, or a plastic mold is manufactured separately by an injection method and installed on the bus bar for mass production. However, since a separate respective mold is necessary to apply to various shapes of the bus bars, there is a constraint on design changes and the cost increases.

The description provided above as a related art of the inventive concept is just for helping in understanding the background of the present disclosure and should not be construed as being included in the related art known by those skilled in the art.

SUMMARY

The present disclosure proposes to solve the aforementioned problems associated with the prior art. An aspect of the present disclosure provides an insulation covered bus bar where the degree of quality does not vary depending on an operator when implementing bus bar insulation, thus securing uniform dimensions and appearance and simplifying a manufacture process. Therefore workability is improved, and a process time is shortened.

An insulation covered bus bar according to the present disclosure includes a bus bar formed of a conductive material for a transmission of electric power. An insulation tube wraps the bus bar and is formed of an insulation material having a characteristic of electric insulation. A fixing unit is formed so as to wrap around an outer circumferential surface of the bus bar, connected to an end of the insulation tube, and installed to be fixedly disposed to the bus bar, so that the insulation tube is fixed within the bus bar.

A fastening hole for connection may be formed at the end of the bus bar, and the insulation tube may wrap the bus bar. However, the end of the bus bar where the fastening hole is formed may be exposed.

A wrinkle shaped section may be formed in which ridges and valleys are continuously repeated in a longitudinal direction on an outer circumferential surface of the insulation tube.

The fixing unit may have a joint in a shape corresponding to the ridges and valleys of the wrinkle section, and the insulation tube may be connected to the bus bar via the joint to wrap a portion of the wrinkle section.

The end of the insulation tube may be connected to the fixing unit, and thus may be fixed to the bus bar through the end.

The insulation tube may be made of a flexible material.

An inner circumferential surface of the fixing unit may be provided with a sealing member to contact the outer circumferential surface of the bus bar when the fixing unit is arranged on the bus bar.

The fixing unit may consist of a separate bottom cover and a separate top cover which wrap the outer circumferential surface of the bus bar, and latching means, which connect the respective facing ends, may be provided on the bottom cover and the top cover, respectively.

The bottom cover and the top cover may have a latch portion and a latch-inserting portion at the respective facing ends, respectively, and the bottom cover and the top cover may be connected with each other when the latch portion and the latch-inserting portion are fastened with each other.

One side of the facing ends of the bottom cover and the top cover may be hinge connected and the latch portion and the latch-insertion portion may be formed at another side thereof.

At least one of locking projections may be formed along an inner circumferential surface of the fixing unit and locking grooves corresponding to the locking projections may be formed on an outer surface of the bus bar.

The locking projections may be symmetrically formed on the inner circumferential surface of the fixing unit and the locking grooves corresponding to the locking projections may be symmetrically formed on the outer circumferential surface of the bus bar.

BRIEF DESCRIPTION OF THE DRAWINGS

The above and other features of the present disclosure will now be described in detail with reference to exemplary embodiments thereof illustrated by the accompanying drawing which are given herein below by way of illustration only, and thus are not limitative of the present disclosure.

Figure 1:
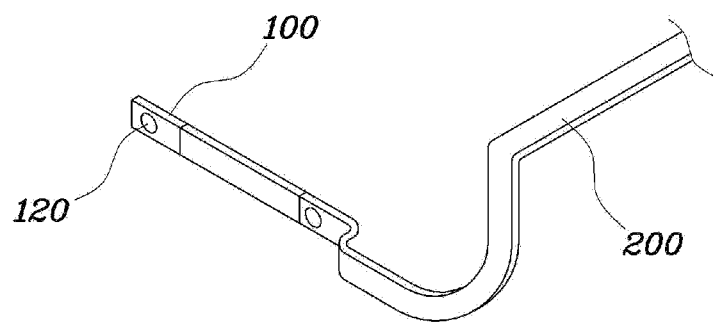
FIG. 1 is a perspective view of an insulation covered bus bar according to the present disclosure.

It should be understood that the accompanying drawings are not necessarily to scale, presenting a somewhat simplified representation of various exemplary features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the inventive concept(s), examples of which are illustrated in the accompanying drawings and described below. While the inventive concept(s) will be described in conjunction with exemplary embodiments, it will be understood that the present description is not intended to limit the present disclosure to those exemplary embodiments. On the contrary, the inventive concept(s) is/are intended to cover the exemplary embodiments as well as various alternatives, modifications, equivalents, and other embodiments, which may be included within the spirit and scope of the disclosure as defined by the accompanying claims.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an insulation covered bus bar according to an exemplary embodiment of the present disclosure is described with reference to the accompanying drawings.

Figure 2:
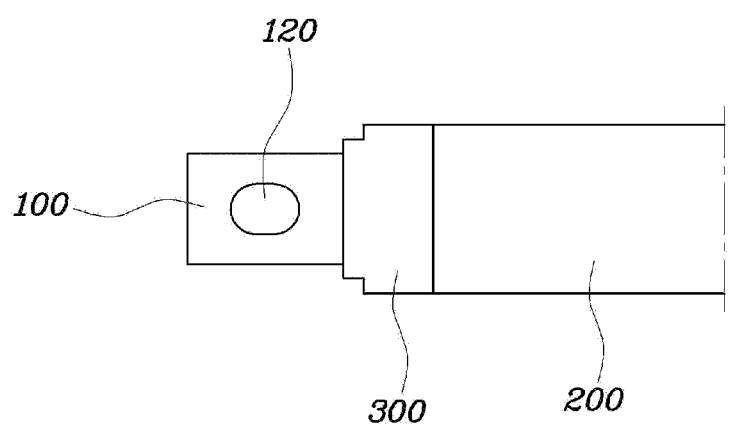
FIG. 2 is a plan view of an insulation covered bus bar according to an embodiment of the present disclosure.
Figure 3:
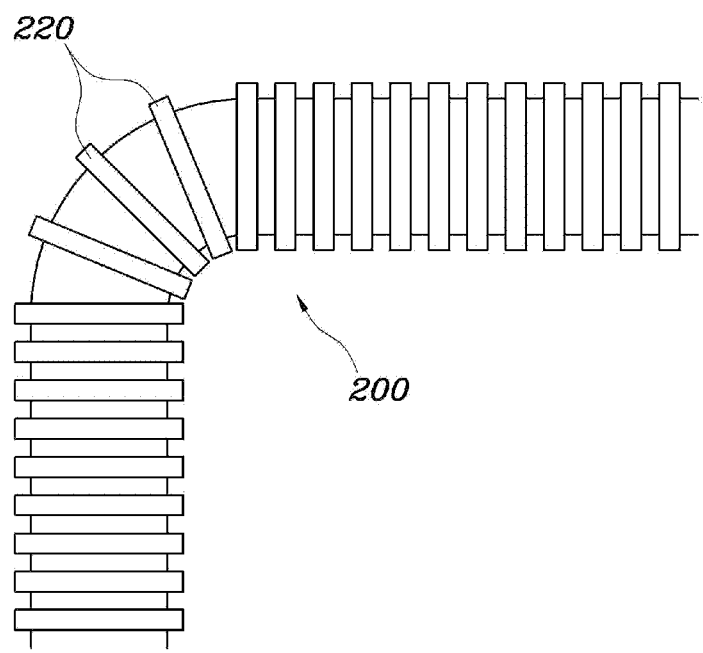
FIG. 3 is a perspective view of an insulation tube of an insulation covered bus bar shown in FIG. 2.
Figure 4:
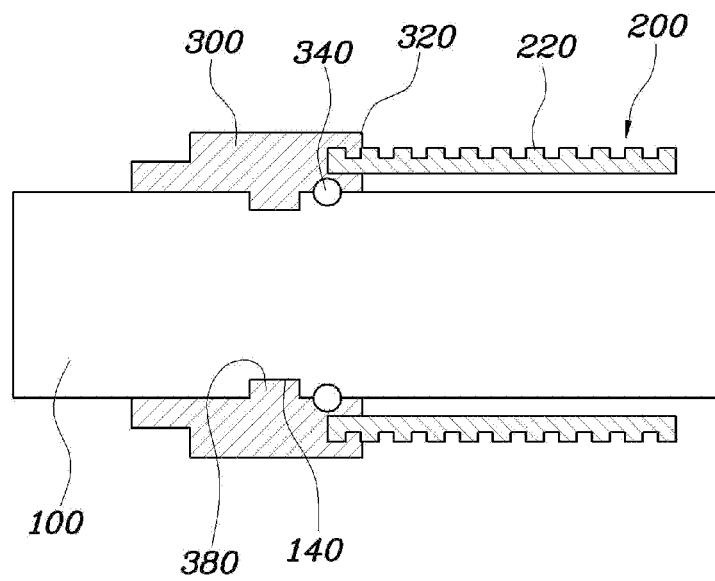
FIG. 4 is a sectional view of an insulation covered bus bar shown in FIG. 2.

FIG. 1 is a perspective view of an insulation covered bus bar according to the present disclosure. FIG. 2 is a plan view of an insulation covered bus bar according to an embodiment of the present disclosure. FIG. 3 is a perspective view of an insulation tube of an insulation covered bus bar shown in FIG. 2. FIG. 4 is a sectional view of an insulation covered bus bar shown in FIG. 2.

An insulation covered bus bar of the present disclosure includes a bus bar 100 formed of a conductive material for transmission of electric power. An insulation tube 200 wraps the bus bar 100 and is formed of an insulation material having a characteristic of electric insulation. A fixing unit 300 is formed so as to wrap around the outer circumferential surface of the bus bar 100, connected to an end of the insulation tube 200, and installed so as to be fixed to the bus bar 100 to dispose the insulation tube 200 to be fixed within the bus bar 100.

Here, the bus bar 100 is conventionally formed of a conductive material for the transmission of electric power.

A fastening hole 120 is formed at the end of the bus bar 100 which is fixed to a front component and a circuit terminal through the fastening hole 120. The structure for connecting the bus bar 100 to a particular component may include the fastening hole 120 as well as various other means and shapes.

Although the bus bar 100 is mostly formed in a rectangular shape, various shapes may be formed depending on the intended use and design thereof. As this is a well-known technology, a detailed description thereof will be omitted.

According to the present disclosure, the insulation tube 200 formed of an insulation material having a characteristic of electrical insulation is arranged so as to wrap the bus bar 100 in order to ensure the stability of the bus bar 100 through which high-electric power is transmitted. Herein, the insulation tube 200 is formed to wrap the bus bar 100 and the end thereof where the fastening hole 120 of the bus bar 100 is exposed.

The bus bar 100 is fastened at both ends to a front component and a circuit board to be electrically connected thereto. The bus bar 100 is insulated through the insulation tube 200, and the both ends of the bus bar 100 are exposed and connected to the electronic components. This prevents the occurrence of electrocutions of a human body or short circuits of a structure due to a direct contact with the bus bar 100 through which a high voltage flows.

The insulation tube 200 may be made of a flexible material. That is, the insulation tube 200 may be made of a stretchable and flexible material, which can conform or match to various forms and shapes of the bus bar 100.

A wrinkle section 220 may have a wrinkle shape in which ridges and valleys are continuously repeated in a longitudinal direction on the outer circumferential surface of the insulation tube 200.

In this way, the wrinkle section 220 is formed in a longitudinal direction on the outer circumferential surface of the insulation tube 200, and thus can flexibly adjust the length of the insulation tube 200, and as shown in FIG. 2, wraps around the bus bar 100 corresponding to the curved portion of the bus bar 100 in various forms of the bus bar.

Further, the bus bar 100 can be protected from external shock by the wrinkle section 220 of the insulation tube 200, which elastically absorbs the shock.

According to the present disclosure, the fixing unit 300 may be provided, which is configured to wrap around the circumferential surface of the bus bar 100, connected to the end of the insulation tube 200, and fixed to the bus bar 100 so that the insulation tube 200 is fixed within the bus bar 100.

This type of fixing unit 300 of the present invention is provided for tightly fixing the insulation tube 200 to the bus bar 100, and the insulation tube 200 may be disposed exactly at a part of the bus bar 100 to be insulated and arranged simply on the bus bar through the fixing unit 300.

The fixing unit 300 has a joint 320 shaped to correspond to the ridges and valleys of the wrinkle section 220, and the insulation tube 200 is connected to the bus bar 100 such that the wrinkle section 200 is partly wrapped through the joint 320. The insulation tube 200 of the present disclosure is fixed to the bus bar 100 by the fixing unit 300 wherein the insulation tube needs to be fixed tightly to the fixing unit 300.

As described above, the insulation tube 200 of the present disclosure is formed with the wrinkle section 220, which has repeated ridges and valleys, to flexibly conform to the shape of the bus bar 100, and the insulation tube 200 is connected to the fixing unit 300 via the wrinkle section 220.

In other words, the fixing unit 300 is provided with the joint 320 shaped to correspond to the ridges and valleys of the wrinkle section 220, the wrinkle section 220 of the insulation tube 200 is partly inserted into the joint 320 to form an engaged structure of the ridges and valleys, thereby tightly fastening the insulation tube 200 to the fixing unit 300. Here, the end of the insulation tube 200 is connected to the fixing unit 300, and the insulation tube may maintain its position on the bus bar 100 through the end.

The fixing unit 300 may be arranged on various positions of the insulation tube 200 in addition to the end thereof, such that the insulation tube 200 is more securely fixed to the bus bar 100. However, in the present disclosure, as the insulation tube 200 is formed so as to respond flexibly to the form of the bus bar 100, the fixing unit 300 may be installed to the end of the insulation tube 200.

In addition, the fixing unit 300 is connected to the end of the insulation tube 200 so that the end of the insulation tube 200 is not exposed. Further, the position of the insulation 200 is restricted into a fixed position by connecting the fixing unit 300 only to the end of the insulation tube 200 and arranging it on the bus bar 100.

The inner circumferential surface of the fixing unit 300 is provided with a sealing member 340 to contact the outer circumferential surface of the bus bar 100 when the fixing unit is arranged on the bus bar 100. In other words, when the fixing unit 300 is arranged on the bus bar 100, the sealing member 340 provided on the inner circumferential surface of the fixing unit 300 contacts the outer circumferential surface of the bus bar 100, thereby preventing moisture and foreign matter from entering the inside of the insulation tube 200.

The sealing member 340 is arranged on the inner circumferential surface of the fixing unit 300, such that when the fixing unit 300 is arranged on the bus bar, the inner circumferential surface of the fixing unit 300 is compressed against the outer circumferential surface of the bus bar 100 to provide a watertight structure to block the inflow of moisture together with foreign objects such as dust from entering into the bus bar 100 inside of the insulation tube 200.

Figure 5:
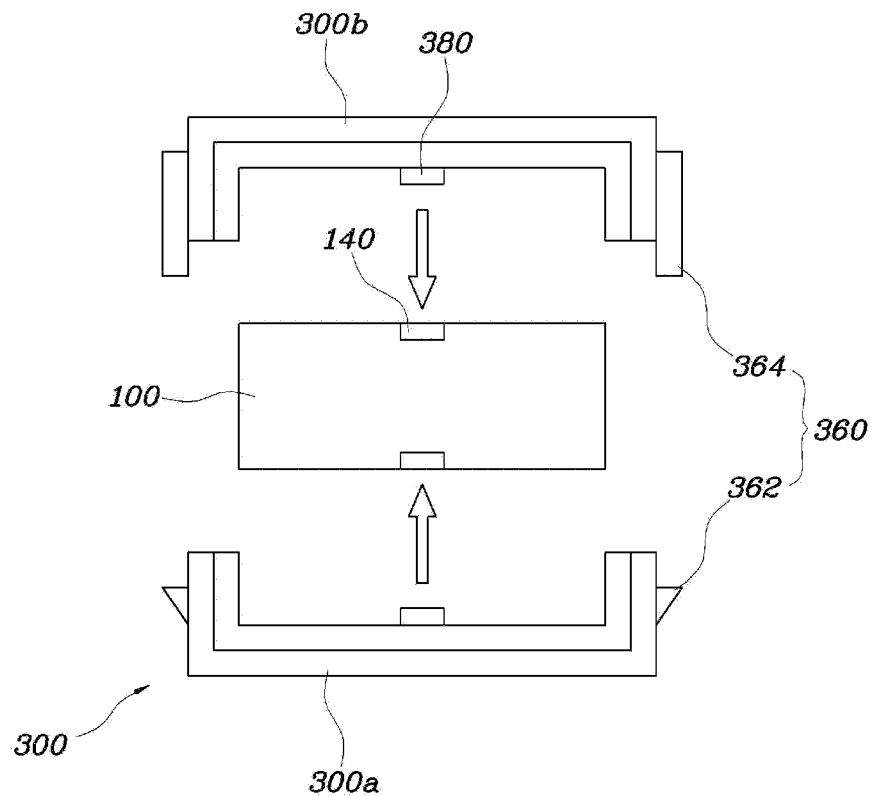
FIG. 5 is a perspective view of a fixing unit of an insulation covered bus bar shown in FIG. 2 according to an embodiment of the present disclosure.

As shown in FIG. 5, the fixing unit 300 consists of a separate bottom cover 300a and a separate top cover 300b which wrap the outer circumferential surface of the bus bar 100, wherein the latching means 360 for connecting the respective facing end may be provided on the bottom cover 300a and the top cover 300b. In more detail, a latch portion 362 and a latch-inserting portion 364 are provided at the respective facing end of the bottom cover 300a and the top cover 300b, and the bottom cover 300a and the top cover 300b are connected with each other when the latch portion 362 and the latch-inserting portion 364 are fastened with each other.

According to the present disclosure, the fixing unit 300 is formed of the separate bottom cover 300a and the separate top cover 300b, and the insulation tube 200 is connected to one end of each cover 300a, 300b. The bottom cover 300a and the top cover 300b are arranged at set locations of the bus bar 100 and then the latch portion 362 and the latch-insertion portion 364 formed on the bottom cover 300a and the top cover 300b, respectively, are fastened to fix easily the fixing unit to the bus bar 100.

Here, a simple assembly process can be achieved by using a hook structure as the latching means 360 for connecting the bottom cover 300a and the top cover 300b, in addition to the latch portion 362 and the latch-insertion portion 364.

Figure 6:
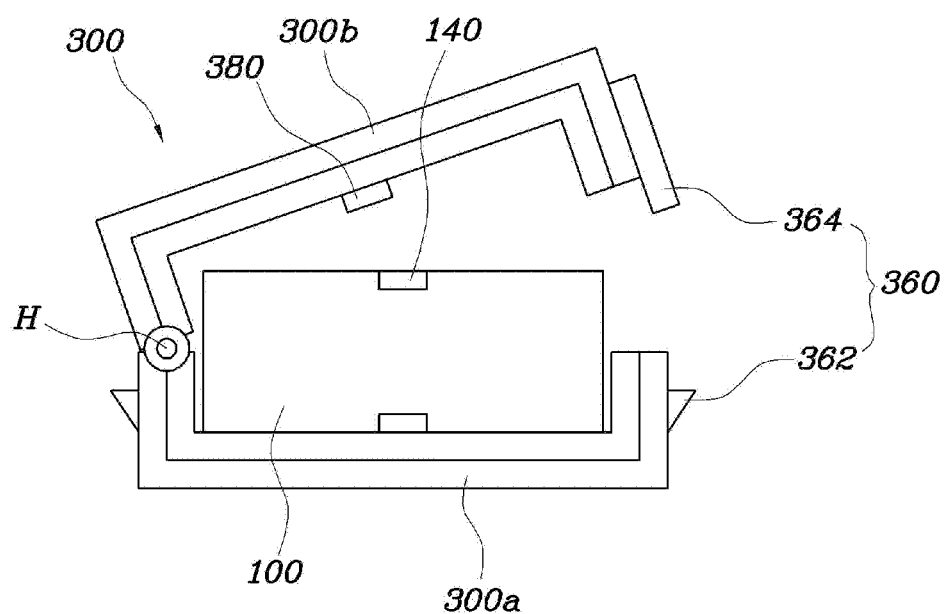
FIG. 6 is a perspective view of a fixing unit of an insulation covered bus bar shown in FIG. 2 according to another embodiment of the present disclosure.

According to an exemplary embodiment of the present disclosure, as shown in FIG. 6, the one side facing ends of the bottom cover 300a and the top cover 300b may be hinge (H)-connected, and the latch portion 362 and the latch-insertion portion 364 may be formed at another side.

In this way, the ends at one side of the bottom cover 300a and the top cover 300b are hinge (H)-connected, the bottom cover 300a or the top cover 300b is rotated around the hinged ends, and the latch portion 362 and latch-insertion portion 364 formed on the ends at the other side of respective covers 300a, 300b, respectively, are fastened, thereby arranging simply and firmly the fixing unit 300 on the bus bar.

The fixing unit 300 consisting of the lower cover 300a and the upper cover 300b needs to fix so as not to slip in a longitudinal direction when fixing to the bus bar 100. For this purpose, at least one of the locking projections 380 is formed along the inner circumferential surface of the fixing unit 300, and the locking grooves 140 corresponding to the locking projections 380 are formed on the outer surface of the bus bar 100.

In this way, the locking projection 380 is formed on the internal circumferential surface of the fixing unit 300, the locking groove 140 corresponding to the locking projection 380 is formed on the bus bar 100, and the locking projection 380 of the fixing unit 300 is inserted into the locking groove 140 of the bus bar 100, thereby restricting displacement in the longitudinal direction. Further, as the fixing unit 300 wraps around the bus bar 100, displacement in a vertical direction is limited, thereby fixing the fixing unit 300 to the bus bar 100. Therefore, the insulation tube 200 connected to the fixing unit 300 can be maintained with respect to the bus bar 100 without changing a position.

The locking projections 380 may be symmetrically formed on the inner circumferential surface of the fixing unit 300, and the locking grooves 140 corresponding to the locking projections 380 may be symmetrically formed on the outer circumferential surface of the bus bar 100. As such, a plurality of the locking projections 380 are formed on the internal circumferential surface of the fixing unit 300, and a plurality of locking grooves 140 are formed on the outer circumferential surface of the bus bar 100, thereby restricting displacement in the longitudinal direction and ensuring durability.

According to the bus bar and insulation tube as configured above, the quality level is not varied depending on the skill of the operator during an insulation process of the bus bar, uniform dimensions, appearance and quality can be secured, and manufacture process is simple, therefore workability is improved, and process time is shortened.

The inventive concept has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. An insulation covered bus bar, comprising:
a bus bar formed of a conductive material for the transmission of electric power;
an insulation tube wrapping the bus bar and formed of an insulation material having a characteristic of electric insulation; and
a fixing unit formed so as to wrap around an outer circumferential surface of the bus bar, connected to an end of the insulation tube, and installed to be fixedly disposed to the bus bar so that the insulation tube is fixed within the bus bar,
wherein one or more locking projections are formed along an inner circumferential surface of the fixing unit and locking grooves corresponding to the locking projections are formed on an outer surface of the bus bar.

2. The insulation covered bus bar of claim 1, wherein the bus bar has a fastening hole for connection at an end thereof, and the insulation tube wraps the bus bar and is exposed at the end of the bus bar where the fastening hole is formed.

3. The insulation covered bus bar of claim 1, wherein the insulation tube has a wrinkle section of continuously repeating ridges and valleys in a longitudinal direction on an outer circumferential surface of the insulation tube.

4. The insulation covered bus bar of claim 3, wherein the fixing unit has a joint corresponding to the ridges and valleys of the wrinkle section and the insulation tube is connected to the bus bar via the joint to wrap a portion of the wrinkle section.

5. The insulation covered bus bar of claim 1, wherein the end of the insulation tube is connected to the fixing unit and the insulation tube is fixed to the bus bar through the end of the insulation tube.

6. The insulation covered bus bar of claim 1, wherein the insulation tube is made of a flexible material.

7. The insulation covered bus bar of claim 1, wherein the inner circumferential surface of the fixing unit is provided with a sealing member to contact the outer circumferential surface of the bus bar when the fixing unit is arranged on the bus bar.

8. The insulation covered bus bar of claim 1, wherein the fixing unit consists of a separate bottom cover and a separate top cover which wrap the outer circumferential surface of the bus bar, and latching means, which connect respective facing ends, are provided on the bottom cover and the top cover, respectively.

9. The insulation covered bus bar of claim 8, wherein the bottom cover and the top cover have a latch portion and a latch-inserting portion at the respective facing ends, respectively, and the bottom cover and the top cover are connected with each other when the latch portion and the latch-inserting portion are fastened with each other.

10. The insulation covered bus bar of claim 9, wherein one side of the facing ends of the bottom cover and the top cover is hinge connected and the latch portion and the latch-insertion portion are formed at another side thereof.

11. The insulation covered bus bar of claim 1, wherein the locking projections are symmetrically formed on the inner circumferential surface of the fixing unit and the locking grooves corresponding to the locking projections are symmetrically formed on the outer circumferential surface of the bus bar.

\* \* \* \* \*